(12) United States Patent
Satou et al.

(10) Patent No.: US 9,787,049 B2
(45) Date of Patent: Oct. 10, 2017

(54) LASER OSCILLATOR HAVING FOLDING MIRROR

(71) Applicant: FANUC CORPORATION, Minamitsuru-gun, Yamanashi (JP)

(72) Inventors: Jun Satou, Yamanashi (JP); Tetsuhisa Takazane, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 15/216,818

(22) Filed: Jul. 22, 2016

(65) Prior Publication Data

US 2017/0033526 A1 Feb. 2, 2017

(30) Foreign Application Priority Data

Jul. 31, 2015 (JP) ................. 2015-151687

(51) Int. Cl.
*H01S 3/07* (2006.01)
*H01S 3/08* (2006.01)
*H01S 3/081* (2006.01)
*H01S 3/223* (2006.01)
*H01S 3/139* (2006.01)

(52) U.S. Cl.
CPC ............ *H01S 3/076* (2013.01); *H01S 3/0815* (2013.01); *H01S 3/08059* (2013.01); *H01S 3/0816* (2013.01); *H01S 3/139* (2013.01); *H01S 3/2232* (2013.01)

(58) Field of Classification Search
CPC ....... H01S 3/076; H01S 3/2232; H01S 3/0815
See application file for complete search history.

(56) References Cited

U.S. PATENT DOCUMENTS

| | | | | |
|---|---|---|---|---|
| 4,977,574 A | * | 12/1990 | Karube | ................... H01S 3/081 372/102 |
| 5,023,886 A | | 6/1991 | Hobart et al. | |
| 2014/0193158 A1 | * | 7/2014 | Ruggiero | ........... G02B 17/0856 398/115 |

FOREIGN PATENT DOCUMENTS

| | | |
|---|---|---|
| JP | 02122586 | 5/1990 |
| JP | H02-201981 A | 8/1990 |
| JP | H08-252683 A | 10/1996 |
| JP | 2004-342681 | 12/2004 |
| JP | 2010118518 | 5/2010 |
| JP | 2011-066300 A | 3/2011 |
| WO | 2013184261 | 12/2013 |

\* cited by examiner

*Primary Examiner* — Dung Nguyen
(74) *Attorney, Agent, or Firm* — RatnerPrestia (57) ABSTRACT

A laser oscillator configured to limit a mode hopping over a long duration. A laser oscillator has an optical resonator including an output coupler and a rear mirror positioned on an optical axis, at least one folding mirror positioned on the optical axis and between the output coupler and the rear mirror, and a discharge tube positioned between the output coupler or the rear mirror and the folding mirror. At least one folding mirror has a toric surface shape, a saddle surface shape or a cylindrical shape, and is configured to rotate about a straight line as a rotation axis, which extends through one point on a surface of the folding mirror and is perpendicular to the surface of the folding mirror.

4 Claims, 10 Drawing Sheets

FIG. 14 ial Invention

LASER OSCILLATOR HAVING FOLDING MIRROR

BACKGROUND OF THE INVENTION

1. Field of the Invention

The present invention relates to a laser oscillator having at least one folding mirror between an output coupler and a rear mirror positioned on an optical axis.

2. Description of the Related Art

In a laser oscillator, a mode hopping phenomenon may occur in which an order of an oscillated laser beam is instantaneously changed. When the mode hopping occurs in a laser oscillator used for processing (e.g., cutting of metal), processing defects (e.g., unevenness of a cut surface or roughness of a processed surface) may be generated.

In the prior art, in order to limit the mode hopping, parameters of components constituting the oscillator (such as curvature radiuses of an output coupler and a rear mirror, an inner diameter of a discharge tube, and an opening size, a number and a position of an aperture arranged in the oscillator) are optimized. Further, when it is insufficient to adjust these parameters for limiting the mode hopping, a concave mirror may be used as a folding mirror, while a plane mirror is usually used as the folding mirror. This is because, when the folding mirror is planar, the folding mirror may be expanded by irradiating high power laser bream on the mirror so that the folding mirror may have a convex shape, which may cause the mode hopping.

As a relevant prior art document, JP H02-201981 A discloses a high power laser device using a concave mirror (a concave spherical mirror and a concave cylindrical mirror) as a folding mirror.

A laser used to cut a metal is required to have a high laser output in order to improve cutting performance. It is known that, in an oscillator having a high laser output such as a carbon dioxide laser, a reflective-index distribution of laser gas may be uneven due to thermal distribution of the laser gas during laser oscillation, and a mechanical distortion or strain may occur due to heat deformation of the oscillator. In such a case, the mode hopping can be limited by arranging a directional folding mirror (e.g., a mirror having a toric surface) in the oscillator.

As a relevant prior art document, JP H08-252683 A discloses a laser concentrating device having two concave reflecting mirrors, in which one of the mirrors is a toroidal reflecting mirror, and the other mirror is a spherical, cylindrical or toroidal reflecting mirror.

JP 2011-066300 A discloses a laser resonator having a reflecting mirror, an output coupler for constituting an optical resonator between reflecting surfaces of the reflecting mirror and the output coupler, and a folding mirror positioned between the reflecting mirror and the output coupler so as to deflect a laser beam, in which the folding mirror is a toroidal mirror.

Further, JP 2004-342681 A discloses a laser oscillator intended to improve roundness of a beam mode, by using a reflecting mirror in which inner curvatures in X- and Y-directions are different.

The uneven reflective-index distribution of laser gas and the mechanical distortion or strain, which may cause the mode hopping, may occur by heat generated during the laser oscillation. As a result, an amount of heat generated during the laser oscillation is varied depending on the condition of the oscillator. Further, the amount of generated heat is significantly different between immediately after the laser oscillator is assembled or manufactured and after the laser oscillator is used over a long duration, due to a dust, etc., adhered to a mirror within the oscillator, etc. Therefore, the reflective-index distribution and the mechanical distortion or strain may be different between immediately after the oscillator is manufactured and after the oscillator is used over a long duration. In other words, even when a directionality of a reflecting surface at the time of manufacture is appropriate with respect to the reflective-index distribution and the direction of the mechanical distortion or strain, the directionality of the reflecting surface may become inappropriate after being used over a long duration. In such a case, the mode hopping cannot be reduced in the configuration of JP H08-252683 A or JP 2011-066300 A, since the direction of the folding mirror cannot be changed.

In the configuration of JP 2004-342681 A, each of the outcoupling mirror and the rear mirror has the reflecting mirror having in which inner curvatures in X- and Y-directions are different. Due to such a configuration, an oscillated beam mode may have an ellipse shape. A high power laser oscillator has a plurality of discharge areas for obtaining a high laser output, and the directionality of the reflective-index distribution may be different in each discharge area. JP 2004-342681 A does not disclose a means for optimizing the beam mode in each discharge area in such a case.

In addition, in JP H02-201981 A, a mirror having a cylindrical shape is used as a folding mirror. However, the cylindrical mirror is always combined with a spherical mirror, and the curvature radius and the direction of the cylindrical mirror are limited in order to reduce or eliminate an aberration of the spherical mirror. The (occurrence) frequency of the mode hopping is not affected by the direction of the cylindrical shape for reducing or eliminating the aberration, and thus it may be difficult to limit the mode hopping by the combination of the cylindrical mirror and the spherical mirror.

SUMMARY OF THE INVENTION

An object of the present invention is to provide a laser oscillator configured to limit the mode hopping over a long duration.

Accordingly, the invention provides a laser oscillator comprising an optical resonator having an output coupler and a rear mirror positioned on an optical axis, the optical resonator having at least one folding mirror positioned between the output coupler and the rear mirror, wherein at least one folding mirror has a toric surface shape, a saddle surface shape or a cylindrical shape, and wherein at least one of the toric surface shape, the saddle surface shape or the cylindrical shape is configured to rotate about a straight line as a rotation axis which extends through one point on a reflecting surface of the folding mirror and is perpendicular to the reflecting surface of the folding mirror.

In a preferred embodiment, a minimum value of a curvature radius of the toric surface shape, the saddle surface shape or the cylindrical shape is between 200 meters and 700 meters, at a cross-section where the reflecting surface of the folding mirror represents a concave surface.

In a preferred embodiment, the optical resonator has at least two folding mirrors having the toric surface shape, the saddle surface shape or the cylindrical shape, wherein a traveling direction of a laser beam in the optical resonator is defined as a Z-axis, X- and Y-axes are defined so as to constitute a right-handed system by the X-, Y- and Z-axes, the X- and Y-axes are transcribed on a tangential plane which contacts each folding mirror at an intersection point between a center axis of the laser beam and each folding mirror, and a cross-section is defined with respect to each folding mirror where the reflecting surface of the folding mirror represents a concave surface and a curvature radius of the toric surface shape, the saddle surface shape or the cylindrical shape is minimum, and wherein the at least two folding mirrors are positioned so that an angle formed by the X-axis transcribed on the tangential plane and an intersection line between the cross-section and the tangential plane with respect to each folding mirror is equal to each other.

In a preferred embodiment, the optical resonator has at least two folding mirrors having the toric surface shape, the saddle surface shape or the cylindrical shape, wherein a traveling direction of a laser beam in the optical resonator is defined as a Z-axis, X- and Y-axes are defined so as to constitute a right-handed system by the X-, Y- and Z-axes, the X- and Y-axes are transcribed on a tangential plane which contacts each folding mirror at an intersection point between a center axis of the laser beam and each folding mirror, and a cross-section is defined with respect to each folding mirror where the reflecting surface of the folding mirror represents a concave surface and a curvature radius of the toric surface shape, the saddle surface shape or the cylindrical shape is minimum, and wherein the at least two folding mirrors are positioned so that an angle formed by the X-axis transcribed on the tangential plane and an intersection line between the cross-section and the tangential plane with respect to each folding mirror is different from each other by 90 degrees.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTIONS

First Embodiment

Figure 1:
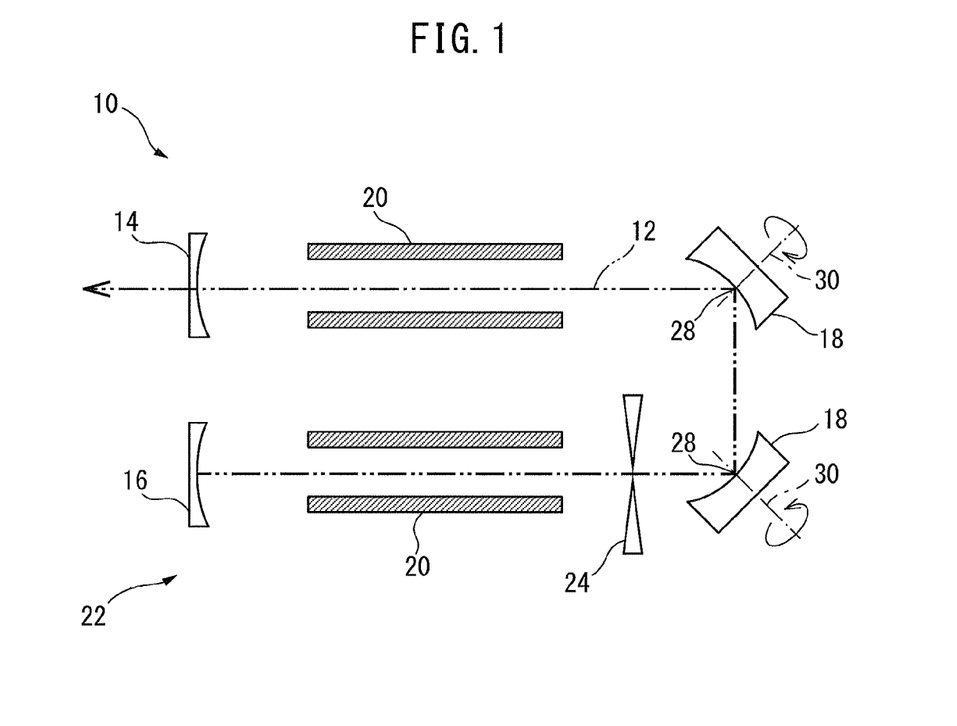
FIG. 1 exemplifies a configuration of a major part of a gas laser oscillator according to a first embodiment of the present invention.

FIG. 1 exemplifies a configuration of a major part of a laser oscillator according to a first embodiment of the present invention. For example, laser oscillator 10 is a gas laser oscillator using carbon dioxide gas as a laser medium, and has an optical resonator 22 including an output coupler 14 and a rear mirror 16 positioned on an optical axis 12, at least one (two in the illustrated embodiment) folding mirror 18 positioned on optical axis 12 and between output coupler 14 and rear mirror 16, and a discharge tube 20 positioned between output coupler 14 or rear mirror 16 and folding mirror 18. At least one folding mirror 18 has a toric (or toroidal) surface shape, a saddle surface shape or a cylindrical shape. Further, optical resonator 22 may have an aperture 24 for shaping a laser beam by shutting a part of the laser beam.

On a plane where at least one folding mirror of the toric (toroidal) surface shape, the saddle surface shape or the cylindrical shape is positioned, the folding mirror is configured to rotate about a straight line as a rotation axis which extends through one point on a reflecting surface of the folding mirror and is perpendicular to the reflecting surface of the folding mirror. For example, laser oscillator 10 has a rotating mechanism configured to rotate the tuning back mirror about the rotation axis. By virtue of this, a mode hopping, due to uneven reflective-index distribution in the laser gas and/or a distortion of the resonator, can be effectively limited over a long period of time. A detail of the rotating mechanism will be explained below.

Figure 2:
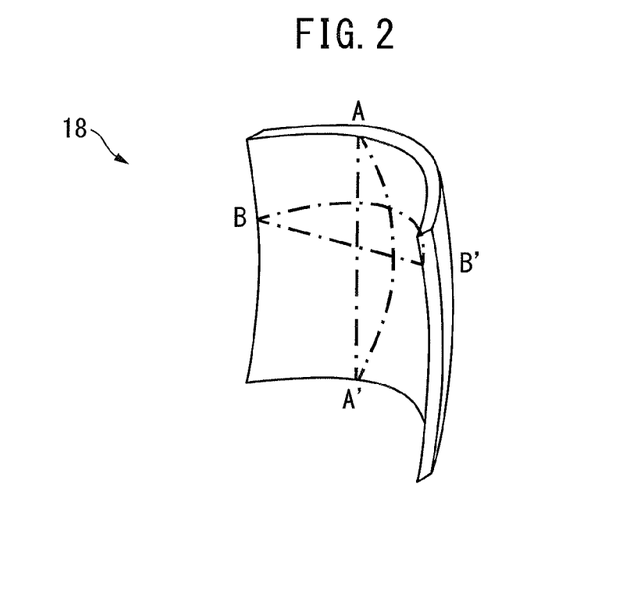
FIG. 2 shows a toric surface shape as an example of a shape of a folding mirror of the gas laser oscillator of FIG. 1.
Figure 3:
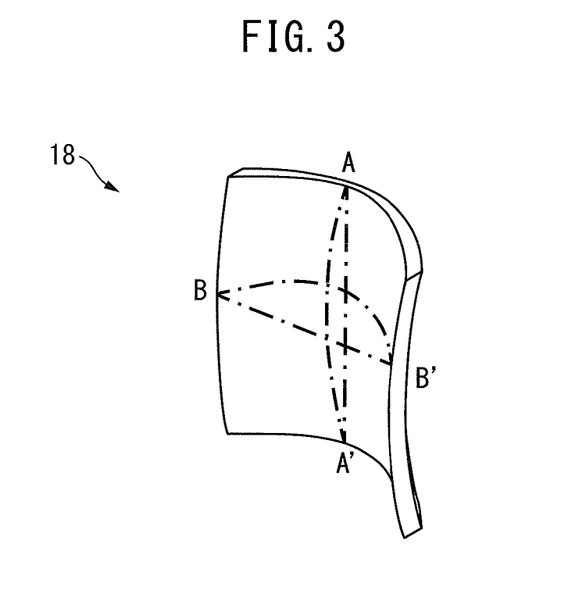
FIG. 3 shows a saddle surface shape as an example of the shape of the folding mirror of the gas laser oscillator of FIG. 1.
Figure 4:
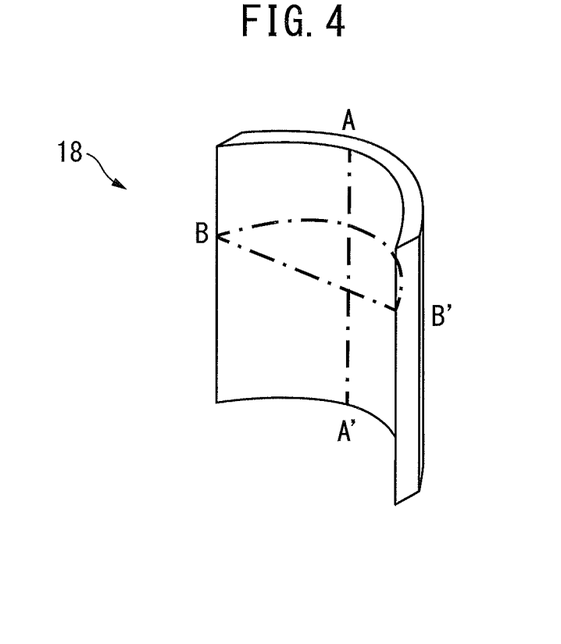
FIG. 4 shows a cylindrical shape as an example of the shape of the folding mirror of the gas laser oscillator of FIG. 1.

FIGS. 2 to 4 are schematic views of mirrors having the toric surface shape, the saddle surface shape and the cylindrical shape, respectively, each of which can be used as folding mirror 18. Each folding mirror has a directionality, and thus a curvature radius of a position on a cross-section A-A' is different from a curvature radius of a position on a cross-section B-B'.

In the toric surface shape as shown in FIG. 2, any cross-section has a concave shape at the center thereof, while a curvature radius is different with respect to each cross-section. Concretely, the curvature radius on cross-section A-A' is minimum, and the curvature radius on cross-section B-B' orthogonal to cross section A-A' is maximum. In other words, in the toric surface shape, a combination of two cross-sections, respectively having the minimum curvature radius and the maximum curvature radius, can always be selected.

In the saddle surface shape as shown in FIG. 3, with respect to two cross-sections orthogonal to each other, one cross-section has a convex shape, and the other cross-section has a concave shape. Concretely, cross-section A-A' has the convex shape, and cross-section B-B' orthogonal to cross section A-A' has the concave shape. Further, the curvature radius on cross-section A-A' is minimum among cross-sections each having a convex shape, and the curvature radius on cross-section B-B' is minimum among cross-sections each having a concave shape. In other words, in the saddle surface shape, a combination of two cross-sections, respectively having the convex surface with the minimum curvature radius and the concave surface with the minimum curvature radius, can always be selected.

In the cylindrical shape as shown in FIG. 4, cross-section B-B' has a concave shape, while cross-section A-A' has a flat shape, In other words, in the cylindrical shape, a combination of a cross-section having the concave surface with the minimum curvature radius and a cross-section having the flat surface can always be selected.

Herein, an angle, between cross-section A-A' of the above three types of surfaces and the tangential plane which contacts the folding mirror at the intersection point between the center of the laser beam and the folding mirror, is defined as "a direction of the folding mirror." Further, a folding mirror, having the combination of the two cross-sections which satisfies the above condition, is defined as "a folding mirror having a reflecting surface with directionality (or a directional reflecting surface)." By using the folding mirror having the directional reflecting surface, an oscillated laser beam has an ellipse or oval shape, and the roundness of the ellipse can be quantified by following equation (1).

$$\text{Roundness} = (\text{Minor axis diameter})/(\text{Major axis diameter}) \quad (1)$$

As shown in FIGS. 2 to 4, by using folding mirror 18 in which the curvature radius is different between each cross-section, the oscillated beam mode has the ellipse shape having the major and minor axes. During the laser oscillation, a reflective-index distribution with directionality may be generated in the laser gas. It is known that, when the beam mode is ovalized in a direction so that the uneven reflective-index distribution is canceled, the mode hopping can be limited. Further, the resonator and/or the mirror may be distorted due to heat generated by the laser oscillation, and the distortion is generated in one direction with respect to the optical axis of the laser beam. Therefore, also in this case, when the oscillated beam mode is ovalized in a direction so that the distortion is canceled, by using folding mirror 18 as shown in FIGS. 2 to 4, the mode hopping can be limited.

Figure 5:
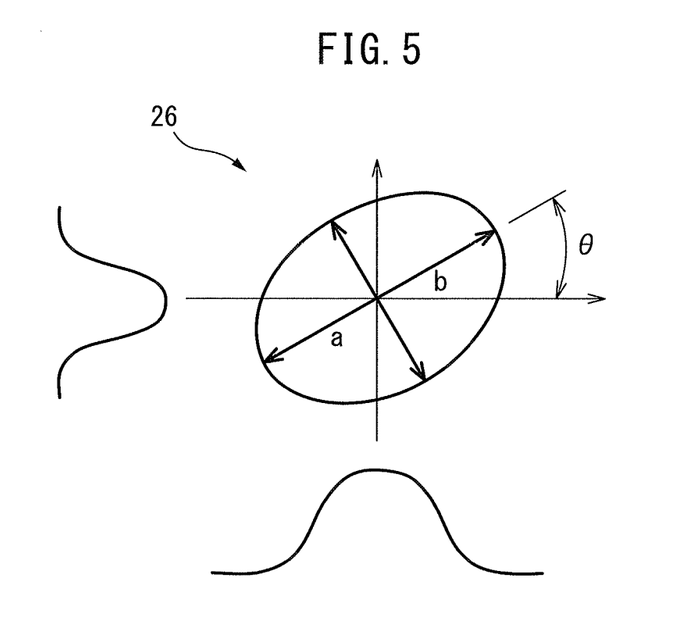
FIG. 5 exemplifies a beam mode ovalized by the laser oscillator of the present invention.
Figure 6:
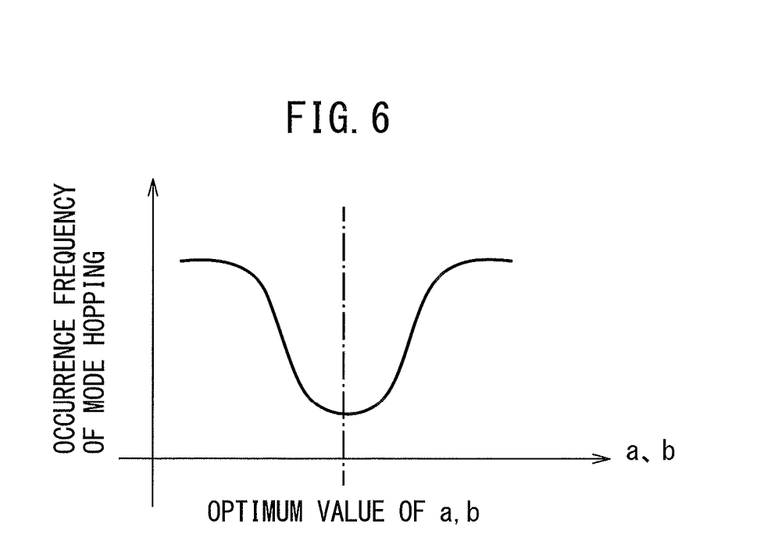
FIG. 6 shows a relationship between frequency of mode hopping and lengths of major and minor axes of the ovalized beam mode.

FIGS. 5 and 6 show an example in which the mode hopping is limited by ovalizing the beam mode. For example, in the toric surface shape of FIG. 2, by respectively optimizing the curvature radius on cross-section A-A' and the curvature radius on cross-section B-B', diameter "a" in the direction of the major axis and diameter "b" in the direction of the minor axis of beam mode 26 can be respectively optimized so that frequency (occurrence frequency) of the mode hopping is minimized, whereby the resonator can be configured so that the mode hopping is limited or not generated. This is also applicable to the saddle surface shape of FIG. 3 and the cylindrical shape of FIG. 4.

Figure 7A:
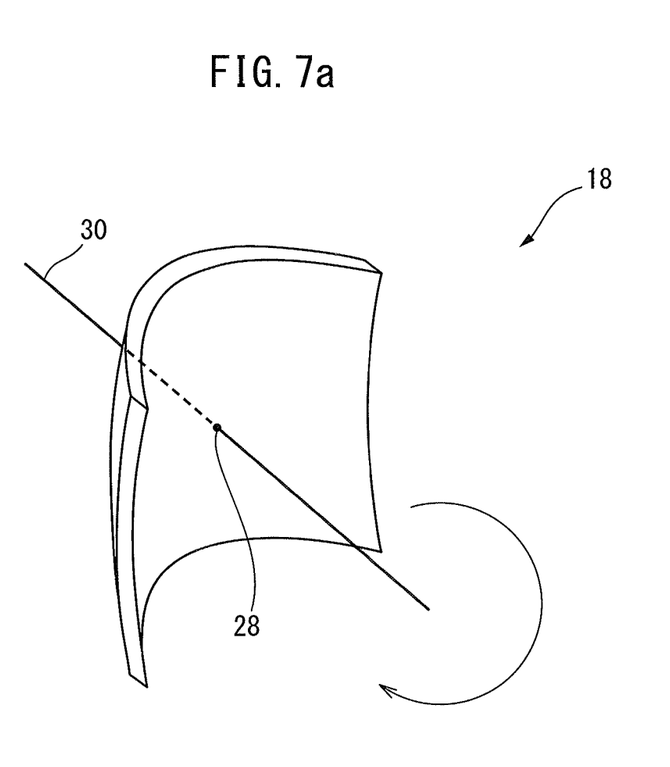
FIG. 7a shows an example of a folding mirror having a rotation axis.

Further, in the present invention, as shown in FIG. 7a, folding mirror 18 can be rotated on a plane to which the folding mirror is mounted. Concretely, when folding mirror 18 is rotated about a straight line 30 as a rotation axis which extends through one point 28 (preferably, an intersection point between optical axis 12 and the reflecting surface) on the reflecting surface of folding mirror 18 and is perpendicular to the reflecting surface of folding mirror 18 at point 28, an angle θ of the major/minor axis of the ellipse representing beam mode 26 can be changed, as shown in FIG. 5.

Figure 8:
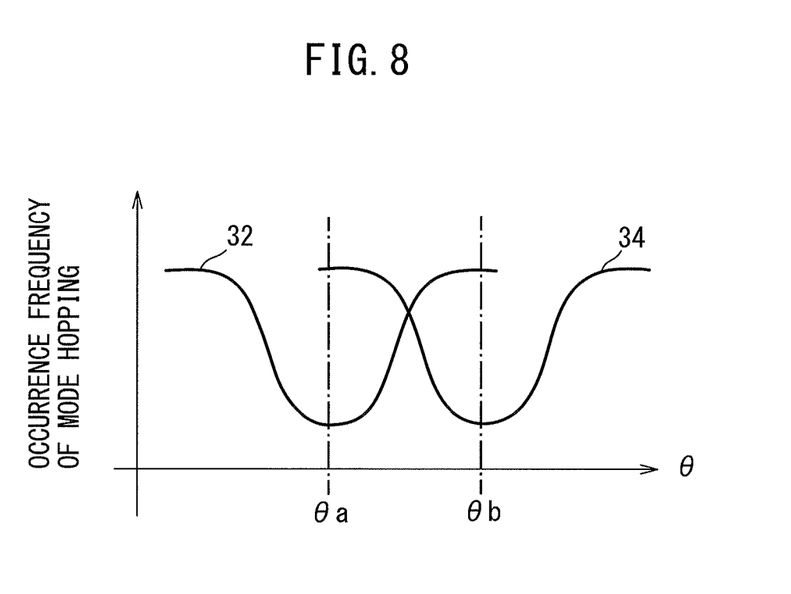
FIG. 8 shows a relationship between frequency of mode hopping and the direction of the oval of the beam mode, at different operation time.

In this regard, as shown in FIG. 8, direction θ of the ellipse, in which the frequency of the mode hopping is minimized, is varied depending on an operating time of the oscillator. For example, FIG. 8 shows a case in which the operating time of the resonator is zero (a graph 32), and a case in which the operating time of the resonator is 1000 hours (a graph 34). In the example of FIG. 8, the frequency of the mode hopping becomes minimum, when direction θ of the ellipse corresponds to θa in graph 32, or when direction θ of the ellipse corresponds to θb in graph 34. Therefore, by rotating folding mirror 18 so as to change the direction of the ellipse of the beam mode corresponding to the operating time, the mode hopping can be properly limited or avoided over a long duration.

Figure 7B:
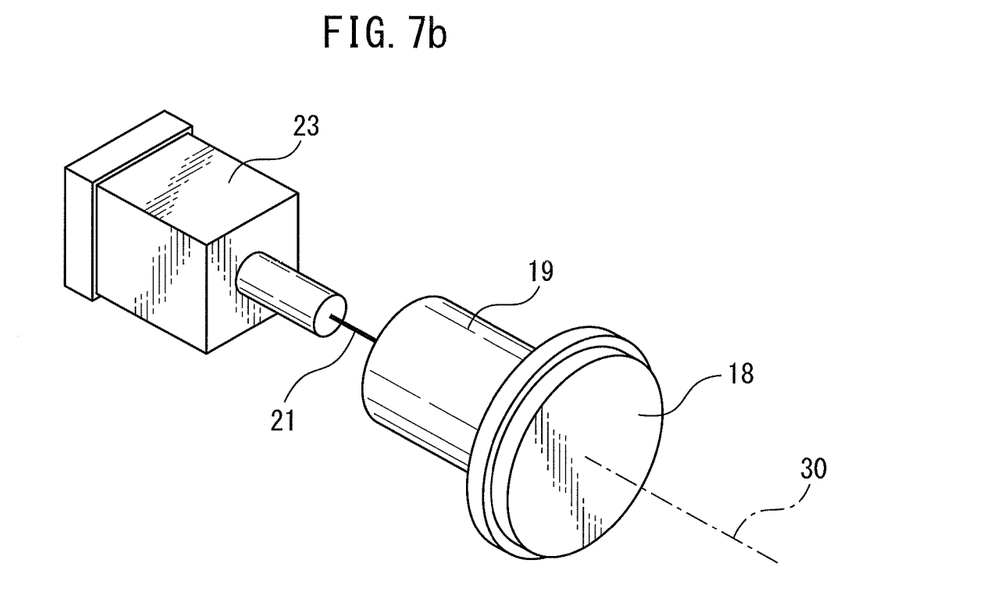
FIG. 7b shows an example of a rotating mechanism of a folding mirror having a rotation axis.

Folding mirror 18 may be automatically rotated by using a rotating mechanism such as an actuator arranged near folding mirror 18, or can be manually rotated by the operator. For example, as shown in FIG. 7b, by activating an actuator 23 connected to a mirror holding part 19 for holding folding mirror 18 via a power transmitting part 21, folding mirror 18 can be automatically rotated about rotation axis 30.

Figure 7C:
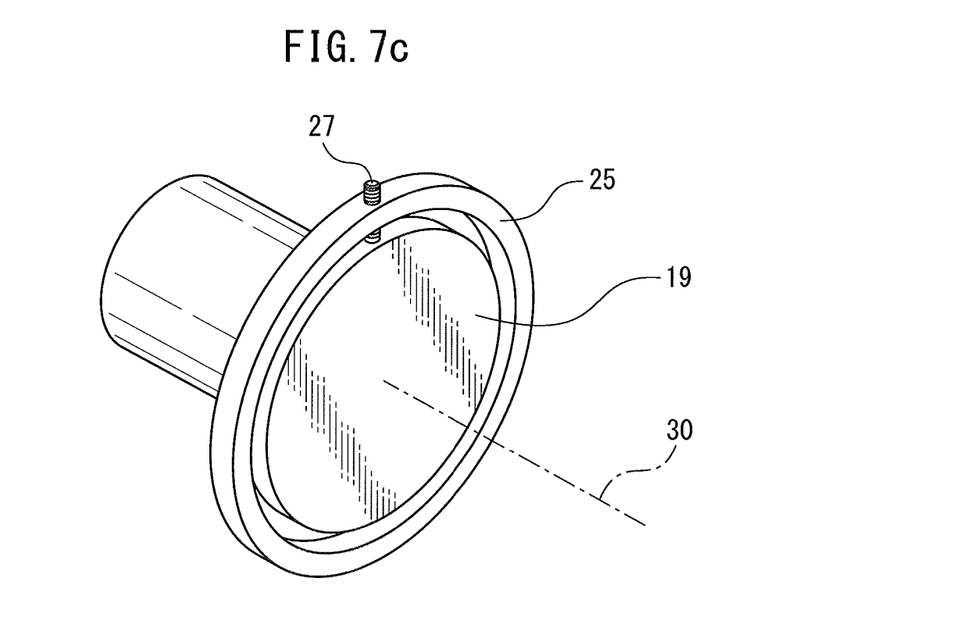
FIG. 7c shows an example of a locking mechanism of a folding mirror having a rotation axis.
Figure 7D:
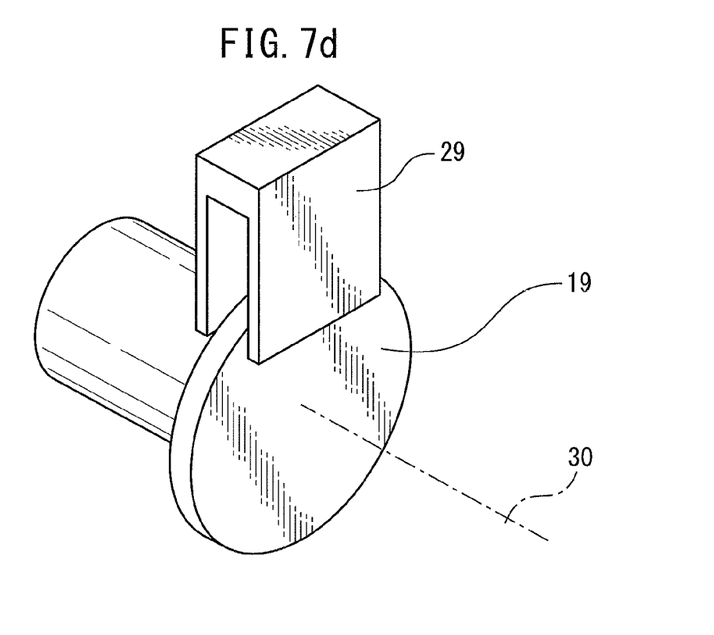
FIG. 7d shows another example of a locking mechanism of a folding mirror having a rotation axis.
Figure 7E:
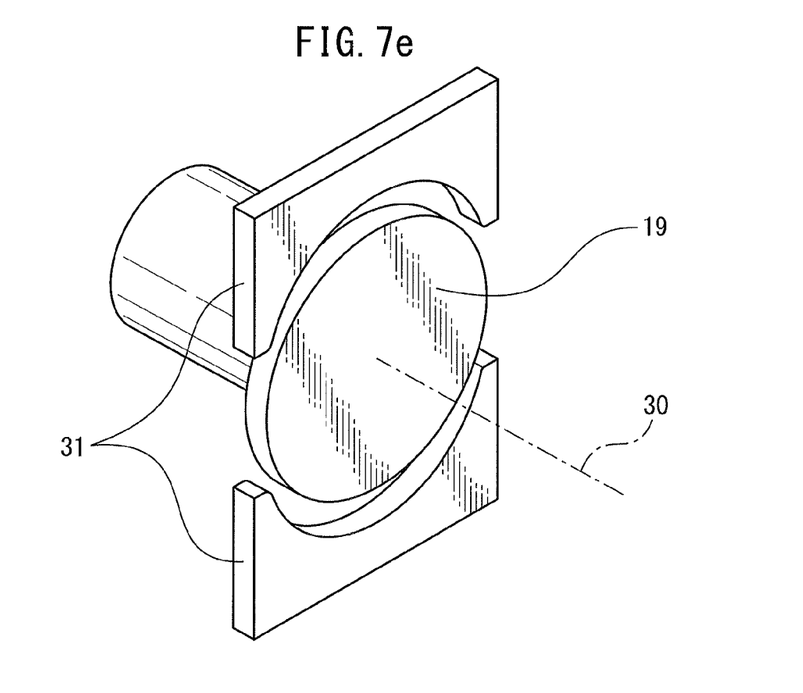
FIG. 7e shows still another example of a locking mechanism of a folding mirror having a rotation axis.

In addition, as shown in FIGS. 7c to 7e, it is preferable to arrange a lock mechanism for locking the rotation angle of folding mirror 18 after adjusting the angle by rotating folding mirror 18. By using the lock mechanism, the rotational position of folding mirror 18 can be precisely maintained over a long duration.

It is preferable that the lock mechanism be easily released, since the rotational position of folding mirror 18 may be required to be readjusted after being locked. Concretely, FIG. 7c exemplifies the locking mechanism for locking the adjusted angle of the folding mirror, in which a ring-shaped screw holding part 25 is arranged near a lateral side of a component (or mirror holding part 19 in this case) constituting the rotating mechanism, and a fixing screw 27 is screwed toward the lateral side of mirror holding part 19 from screw holding part 25. Alternatively, FIG. 7d exemplifies the locking mechanism, in which a component (or a flange of mirror holding part 19 in this case) extending perpendicular to rotation axis 30 is locked by an openable toggle clamp 29. Further, FIG. 7e exemplifies a pair of locking mechanisms (or a brake mechanism) 31, which is arranged near an outer peripheral of the flange of mirror holding part 19 so that the brake mechanism can nip and lock the flange. The lock mechanisms as described above can be easily released.

Second Embodiment

The second embodiment relates to the curvature radius of the folding mirror. With respect to the mirror having the different curvature radius in each direction as shown in FIGS. 2 to 4, the effect in limiting the mode hopping has a relationship with the curvature radius on the concave cross-section where the curvature radius is minimum (for example, cross-section A-A'). Hereinafter, such a curvature radius is referred to as a "concave minimum curvature radius." Concretely, as the concave minimum curvature radius of folding mirror 18 is decreased, the probability of the mode hopping is decreased. On the other hand, when the concave minimum curvature radius is lower than 100 meters, the roundness of the oscillated laser beam is decreased, whereby machining performance (e.g., a cutting velocity, a roughness of a cutting surface, and an appearance of the cutting surface) in cutting a metal may be different between the longitudinal direction and the transverse direction of a machined workpiece. In order to avoid such a disadvantage, it is preferable that the concave minimum curvature radius be between 200 meters and 700 meters.

In the second embodiment, when the concave minimum curvature radius is within the above range, the frequency of the mode hopping can be limited while maintaining the roundness of the beam mode within a certain range, whereby the above disadvantage (i.e., the machining performance (the cutting velocity, the roughness of a cutting surface, and the appearance of the cutting surface, etc.) is different between the longitudinal direction and the transverse direction of the workpiece) can be avoided.

Third Embodiment

Figure 9:
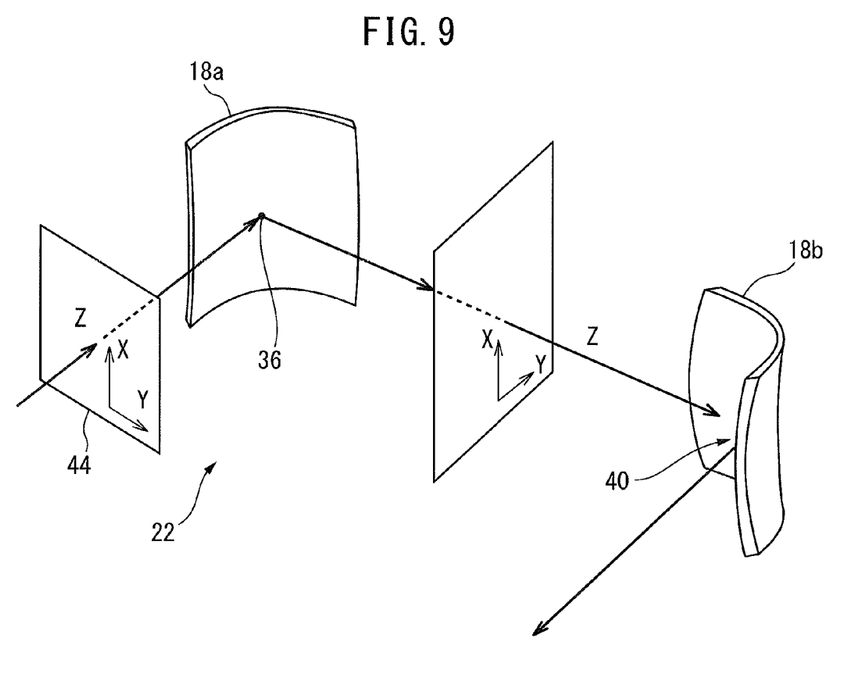
FIG. 9 exemplifies a configuration about a folding mirror of a laser oscillator according to a third embodiment of the present invention.
Figure 10:
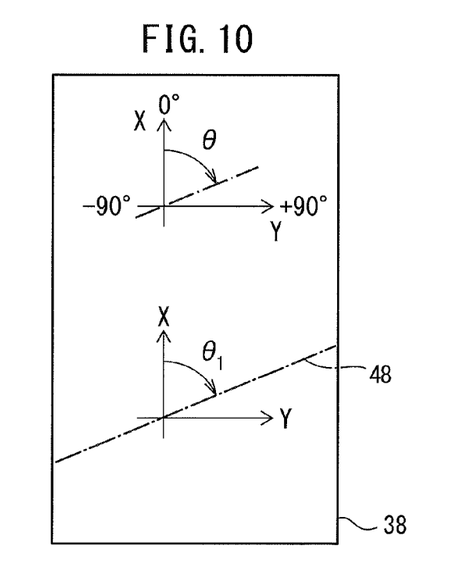
FIG. 10 exemplifies a tangential plane which contacts a first folding mirror of FIG. 9.
Figure 11:
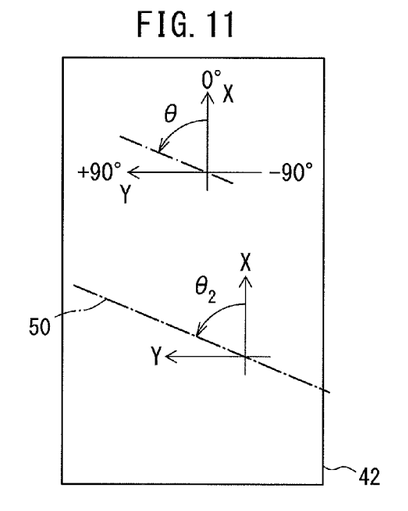
FIG. 11 exemplifies a tangential plane which contacts a second folding mirror of FIG. 9.

FIGS. 9 to 11 explain a third embodiment of the present invention. As shown in FIG. 9, optical resonator 22 has at least two saddle-shaped folding mirrors 18a and 18b, and at least one of mirrors 18a and 18b is configured to rotate similarly to folding mirror 18 as shown in FIG. 7a. FIG. 10 shows a tangential plane 38 which contacts folding mirror 18a at an intersection point 38 between the center of the laser beam and folding mirror 18a, and FIG. 11 shows a tangential plane 42 which contacts folding mirror 18b at an intersection point 40 between the center of the laser beam and folding mirror 18b. Since components of the third embodiment other than the illustrated components may be similar to the components of the first embodiment, a detailed explanation thereof will be omitted.

In the third embodiment, the traveling direction of the laser beam (toward first folding mirror 18a in this case) in optical resonator 22 is defined as a Z-axis, and X- and Y-axes (or an X-Y plane 44) are defined so as to constitute a right-handed system by the X-, Y- and Z-axes. Then, the defined X- and Y-axes are transcribed on tangential plane 38 as shown in FIG. 10, and are transcribed on tangential plane 42 as shown in FIG. 11. Further, as shown in FIG. 10, a cross-section is defined with respect to folding mirror 18a where the reflecting surface thereof represents a concave surface and a curvature radius of the toric surface shape, the saddle surface shape or the cylindrical shape is minimum, and an intersection line between the cross-section and tangential plane 38 is a straight line indicated by a chain line 48. On the other hand, as shown in FIG. 11, a cross-section is defined with respect to folding mirror 18b where the reflecting surface thereof represents a concave surface and a curvature radius of the toric surface shape, the saddle surface shape or the cylindrical shape is minimum, and an intersection line between the cross-section and tangential plane 42 is a straight line indicated by a chain line 50. In the third embodiment, an angle $\Gamma 1$ formed by the X-axis and straight line 48 on tangential plane 38 and an angle $\theta 2$ formed by the X-axis and straight line 50 on tangential plane 42 are calculated, and first and second folding mirrors 18a and 18b are positioned and configured so that angle $\theta 1$ and angle $\theta 2$ are equal to each other ($\theta 1=\theta 2$). In addition, in FIG. 10, the X-axis is defined as a reference axis (0°), and a direction from the X-axis toward the Y-axis is defined as a plus angle. These definitions are also applicable to FIGS. 11, 13 and 14 described below.

In this case, when the concave minimum curvature radiuses of first and second folding mirrors 18a and 18b are defined as R1 and R2, respectively, an effective concave minimum curvature radius R obtained by combining the effects of the two mirrors is represented by following equation (2).

$$1/R=1/R1+1/R2 \qquad (2)$$

When effective concave minimum curvature radius R is calculated by using equation (2), inequalities (R<R1) and (R<R2) are always true. Therefore, in the third embodiment, similarly to the second embodiment, the concave minimum curvature radius can be small, and an ellipticity of the beam mode can be increased, whereby the mode hopping can be effectively limited. Then, by rotating the folding mirror so as to change the direction of the ellipse of the beam mode, the occurrence of the mode hopping can be limited for a long duration.

Fourth Embodiment

Figure 12:
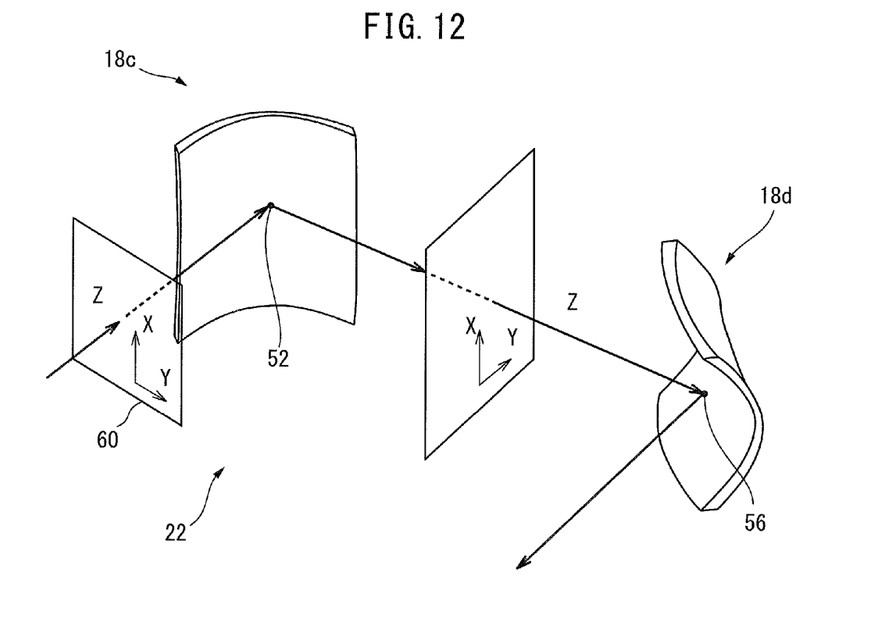
FIG. 12 exemplifies a configuration about a folding mirror of a laser oscillator according to a fourth embodiment of the present invention.
Figure 13:
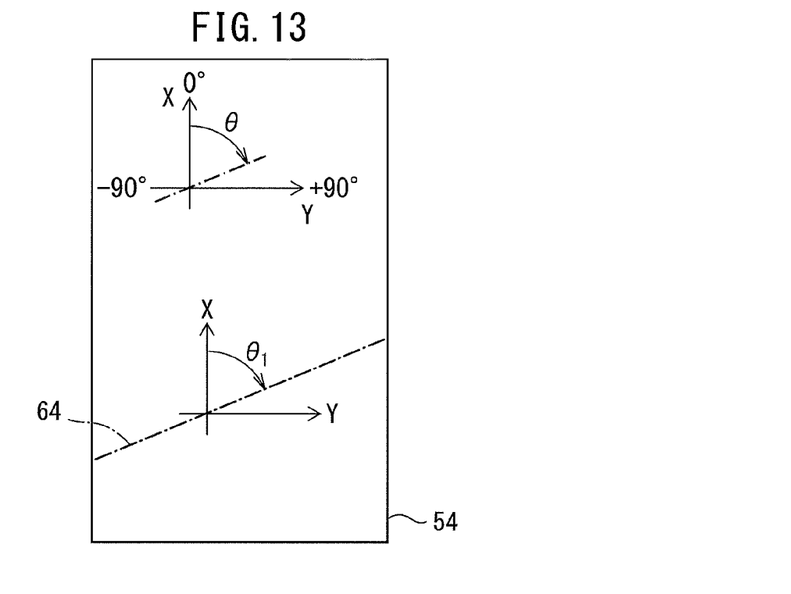
FIG. 13 exemplifies a tangential plane which contacts a first folding mirror of FIG. 12.
Figure 14:
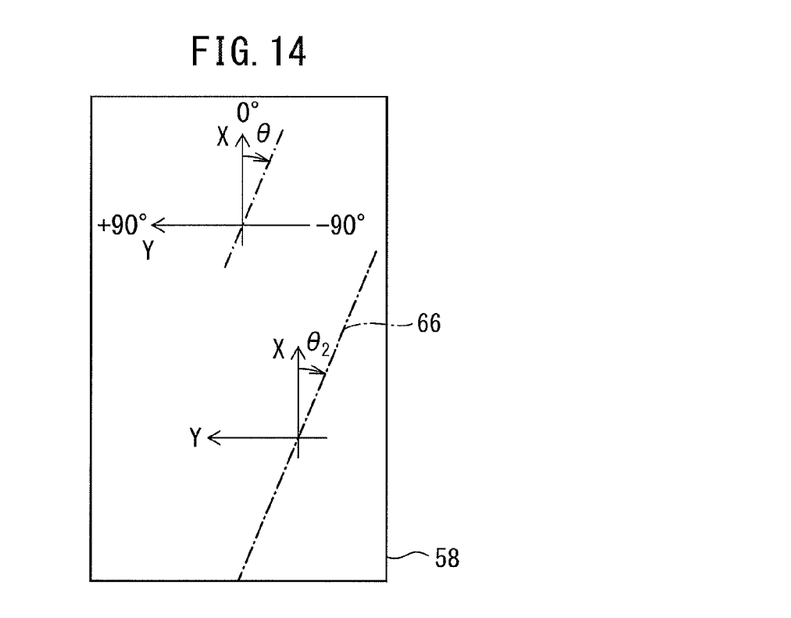
FIG. 14 exemplifies a tangential plane which contacts a second folding mirror of FIG. 12.

A fourth embodiment will be explained with reference to FIGS. 12 to 14, in which the beam mode may have a shape close to a true circle by using another feature other than that of the second embodiment, in which the range of the curvature radius of each folding mirror is defined. As shown in FIG. 12, optical resonator 22 has at least two saddle-shaped folding mirrors 18c and 18d, and at least one of mirrors 18c and 18d is configured to rotate similarly to folding mirror 18 as shown in FIG. 7a. FIG. 13 shows a tangential plane 54 which contacts folding mirror 18c at an intersection point 52 between the center of the laser beam and folding mirror 18c, and FIG. 14 shows a tangential plane 58 which contacts folding mirror 18d at an intersection point 56 between the center of the laser beam and folding mirror 18d. Since components of the fourth embodiment other than the illustrated components may be similar to the components of the first embodiment, a detailed explanation thereof will be omitted.

In the fourth embodiment, the traveling direction of the laser beam (toward first folding mirror 18c in this case) in optical resonator 22 is defined as a Z-axis, and X- and Y-axes (or an X-Y plane 60) are defined so as to constitute a right-handed system by the X-, Y- and Z-axes. Then, the defined X- and Y-axes are transcribed on tangential plane 54 as shown in FIG. 13, and are transcribed on tangential plane 58 as shown in FIG. 14.

Further, as shown in FIG. 13, a cross-section is defined with respect to folding mirror 18c where the reflecting surface thereof represents a concave surface and a curvature radius of the toric surface shape, the saddle surface shape or the cylindrical shape is minimum, and an intersection line between the cross-section and tangential plane 54 is a straight line indicated by a chain line 64. On the other hand, as shown in FIG. 14, a cross-section is defined with respect to folding mirror 18d where the reflecting surface thereof represents a concave surface and a curvature radius of the toric surface shape, the saddle surface shape or the cylindrical shape is minimum, and an intersection line between the cross-section and tangential plane 58 is a straight line indicated by a chain line 66. In the fourth embodiment, an angle $\theta 1$ formed by the X-axis and straight line 64 on tangential plane 54 and an angle $\theta 2$ formed by the X-axis and straight line 66 on tangential plane 58 are calculated, and at least one combination of first and second folding mirrors 18c and 18d can be configured so that angle $\theta 1$ and angle $\theta 2$ are different from each other by 90 degrees ($\theta 2=\theta 1-90°$). In addition, in FIG. 10, the X-axis is defined as a reference axis) (0°, and a direction from the X-axis toward the Y-axis is defined as a plus angle.

In the fourth embodiment, unlike the third embodiment, the frequency of the mode hopping is affected by the curvature radius of the convex surface of second folding mirror 18d. In this regard, a curvature radius of a convex cross-section where the curvature radius is minimum (hereinafter, referred to as a "convex minimum curvature radius") is represented by "r2." On the other hand, with respect to folding mirror 18c, effective concave minimum curvature radius R obtained by combining the effects of the two mirrors is affected by concave minimum curvature radius R1, similarly to the third embodiment. In this case, effective concave minimum curvature radius R is represented by following equation (3).

$$1/R=1/R1-1/r2 \qquad (3)$$

When effective concave minimum curvature radius R is calculated by using equation (3), an inequality (R>R1) is always true. Therefore, in the fourth embodiment, the beam mode can be close to a true circle, whereby the disadvantage (i.e., the machining performance (the cutting velocity, the roughness of a cutting surface, and the appearance of the cutting surface, etc.) is different between the longitudinal direction and the transverse direction of the workpiece) can be avoided.

The above first to fourth embodiments may be combined. For example, the folding mirror having the curvature radius as explained in the second embodiment may be used in the third or fourth embodiment.

According to the present invention, by using the folding mirror having the reflecting surface with directionality, the oscillated beam mode has the ellipse shape having the major and minor axes with different radiuses. The mode hopping is limited when the beam mode is ovalized in the direction so that the uneven reflective-index distribution in the laser gas and the distortion of the resonator, generated due to heat during the laser oscillation, are canceled. Further, since the degree of the reflective-index distribution and the distortion of the resonator are varied by using the laser oscillator for a long time, the direction of the ellipse for limiting the mode hopping is also varied. By rotating the folding mirror, the direction of the ellipse can be adjusted, whereby the mode hopping can be limited over a long period of time.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A laser oscillator comprising an optical resonator having an output coupler and a rear mirror positioned on an optical axis, the optical resonator having at least one folding mirror positioned between the output coupler and the rear mirror,
    wherein at least one folding mirror has a toric surface shape, a saddle surface shape or a cylindrical shape,
    and wherein at least one of the toric surface shape, the saddle surface shape or the cylindrical shape is configured to rotate about a straight line as a rotation axis which extends through one point on a reflecting surface of the folding mirror and is perpendicular to the reflecting surface of the folding mirror.

2. The laser oscillator as set forth in claim 1, wherein a minimum value of a curvature radius of the toric surface shape, the saddle surface shape or the cylindrical shape is between 200 meters and 700 meters, at a cross-section where the reflecting surface of the folding mirror represents a concave surface.

3. The laser oscillator as set forth in claim 1, wherein the optical resonator has at least two folding mirrors having the toric surface shape, the saddle surface shape or the cylindrical shape,
    wherein a traveling direction of a laser beam in the optical resonator is defined as a Z-axis, X- and Y-axes are defined so as to constitute a right-handed system by the X-, Y- and Z-axes, the X- and Y-axes are transcribed on a tangential plane which contacts each folding mirror at an intersection point between a center axis of the laser beam and each folding mirror, and a cross-section is defined with respect to each folding mirror where the reflecting surface of the folding mirror represents a concave surface and a curvature radius of the toric surface shape, the saddle surface shape or the cylindrical shape is minimum,
    and wherein the at least two folding mirrors are positioned so that an angle formed by the X-axis transcribed on the tangential plane and an intersection line between the cross-section and the tangential plane with respect to each folding mirror is equal to each other.

4. The laser oscillator as set forth in claim 1, wherein the optical resonator has at least two folding mirrors having the toric surface shape, the saddle surface shape or the cylindrical shape,
    wherein a traveling direction of a laser beam in the optical resonator is defined as a Z-axis, X- and Y-axes are defined so as to constitute a right-handed system by the X-, Y- and Z-axes, the X- and Y-axes are transcribed on a tangential plane which contacts each folding mirror at an intersection point between a center axis of the laser beam and each folding mirror, and a cross-section is defined with respect to each folding mirror where the reflecting surface of the folding mirror represents a concave surface and a curvature radius of the toric surface shape, the saddle surface shape or the cylindrical shape is minimum,
    and wherein the at least two folding mirrors are positioned so that an angle formed by the X-axis transcribed on the tangential plane and an intersection line between the cross-section and the tangential plane with respect to each folding mirror is different from each other by 90 degrees.

* * * * *